US009554108B2

(12) United States Patent
Doida

(10) Patent No.: US 9,554,108 B2
(45) Date of Patent: Jan. 24, 2017

(54) IMAGE PROCESSING DEVICE AND STORAGE MEDIUM STORING IMAGE PROCESSING PROGRAM

(75) Inventor: Shigeru Doida, Kawasaki (JP)

(73) Assignee: NIKON CORPORATION, Tokyo (JP)

(*) Notice: Subject to any disclaimer, the term of this patent is extended or adjusted under 35 U.S.C. 154(b) by 0 days.

(21) Appl. No.: 13/805,941

(22) PCT Filed: Jun. 6, 2011

(86) PCT No.: PCT/JP2011/003181
§ 371 (c)(1),
(2), (4) Date: Dec. 20, 2012

(87) PCT Pub. No.: WO2011/161883
PCT Pub. Date: Dec. 29, 2011

(65) Prior Publication Data
US 2013/0100313 A1 Apr. 25, 2013

(30) Foreign Application Priority Data
Jun. 25, 2010 (JP) ................. 2010-144604

(51) Int. Cl.
H04N 5/228 (2006.01)
H04N 9/73 (2006.01)
(Continued)

(52) U.S. Cl.
CPC .......... H04N 9/73 (2013.01); H04N 9/69 (2013.01); H04N 19/186 (2014.11);
(Continued)

(58) Field of Classification Search
CPC ........... H04N 5/23229; H04N 5/23232; H04N 5/23235
(Continued)

(56) References Cited

U.S. PATENT DOCUMENTS 7,880,771 B2* 2/2011 Toyoda ............... 348/222.1
2005/0141772 A1* 6/2005 Okada ................. 382/238
(Continued)

FOREIGN PATENT DOCUMENTS

CN 1671184 A 9/2005
JP A-2002-125241 4/2002
(Continued)

OTHER PUBLICATIONS

Aug. 23, 2011 Written Opinion of the International Searching Authority issued in International Application No. PCT/JP2011/003181 (with partial translation).
(Continued)

Primary Examiner — Sinh Tran
Assistant Examiner — Zhenzhen Wu
(74) Attorney, Agent, or Firm — Oliff PLC

(57) ABSTRACT

An image processing device includes an imaging unit generating RAW image data of a shot image and a gradation conversion unit. The imaging unit includes an imaging sensor which converts an image of a subject into an electrical signal. Then the gradation conversion unit performs gradation conversion according to a shooting condition for each of color signals based on a pixel array of the imaging sensor on the RAW image data of continuously shot images. Thus, it is possible to efficiently compress the RAW image data of continuously shot images.

13 Claims, 4 Drawing Sheets

(51) Int. Cl.
  *H04N 9/69* (2006.01)
  *H04N 19/196* (2014.01)
  *H04N 19/60* (2014.01)
  *H04N 19/186* (2014.01)
  *H04N 19/85* (2014.01)
  *H04N 9/04* (2006.01)
  *H04N 101/00* (2006.01)

(52) U.S. Cl.
  CPC ........... *H04N 19/197* (2014.11); *H04N 19/60* (2014.11); *H04N 19/85* (2014.11); *H04N 9/045* (2013.01); *H04N 2101/00* (2013.01)

(58) Field of Classification Search
  USPC ............................. 348/222.1, 223.1; 382/166
  See application file for complete search history.

(56) References Cited

U.S. PATENT DOCUMENTS

| | | | |
|---|---|---|---|
| 2006/0119712 | A1 | 6/2006 | Yamamoto et al. |
| 2006/0238834 | A1* | 10/2006 | Ozawa et al. ................ 358/521 |
| 2007/0097225 | A1* | 5/2007 | Sato et al. ................ 348/222.1 |
| 2009/0021601 | A1* | 1/2009 | Tanaka et al. ............ 348/222.1 |
| 2009/0041350 | A1* | 2/2009 | Utagawa et al. ............ 382/169 |
| 2009/0153683 | A1 | 6/2009 | Furukawa |
| 2010/0097482 | A1* | 4/2010 | Kuniba ...................... 348/222.1 |
| 2010/0259650 | A1* | 10/2010 | Sasaki ........................... 348/241 |
| 2012/0182440 | A1* | 7/2012 | Toyoda ..................... 348/222.1 |

FOREIGN PATENT DOCUMENTS

| | | |
|---|---|---|
| JP | 2005-268952 A | 9/2005 |
| JP | 2007-198831 A | 8/2007 |
| JP | A-2008-67315 | 3/2008 |
| JP | B2-4372686 | 11/2009 |
| WO | WO 2008/132791 A1 | 11/2008 |

OTHER PUBLICATIONS

Aug. 23, 2011 International Search Report issued in International Application No. PCT/JP2011/003181.
Oct. 13, 2015 Office Action issued in Japanese Application No. 2012-521282.
Apr. 27, 2015 Office Action issued in Chinese Patent Application No. 201180031594.7.
Mar. 8, 2016 Office Action issued in Chinese Patent Application No. 201180031594.7.
Translation of Apr. 27, 2015 Office Action issued in Chinese Patent Application No. 201180031594.7.
Translation of Mar. 8, 2016 Office Action issued in Chinese Patent Application No. 201180031594.7.

* cited by examiner

IMAGE PROCESSING DEVICE AND STORAGE MEDIUM STORING IMAGE PROCESSING PROGRAM

CROSS-REFERENCE TO RELATED APPLICATIONS

This application is a U.S. National Stage application claiming the benefit of prior filed International Application Number PCT/JP2011/003181, filed Jun. 6, 2011, in which the International Application claims a priority date of Jun. 25, 2010 based on prior filed Japanese Application Number 2010-144604, the entire contents of which are incorporated herein by reference.

TECHNICAL FIELD

The present application relates to an image processing device and an image processing program.

BACKGROUND ART

Generally, in an imaging device of a digital camera or the like, image processing such as color interpolation processing is performed on RAW image data output from an imaging sensor, and data after the image processing are compressed in a general image file format. For example, in shooting of a still image, data after image processing are compressed in a JPEG (Joint Photographic Experts Group) format. Further, in shooting of a moving image, data after image processing are compressed in an MPEG (Moving Picture Experts Group) format or the like. Data after compression are stored in a storage medium or the like.

In recent years, digital cameras which store RAW image data at a time of shooting a still image in a storage medium or the like are becoming popular. The RAW image data are utilized when, for example, a color tone, a contrast, or the like of an image is adjusted accurately after shooting. Note that in the RAW image data, generally, the data amount is large as compared to data on which image processing and compression processing are performed. Accordingly, there has been proposed a technique to compress RAW image data at a time of shooting a still image by each of color components, and store data after compression of each of the color components in a storage medium or the like (for example, refer to Patent Document 1).

Patent Document 1: Japanese Unexamined Patent Application Publication No. 2002-125241

DISCLOSURE

Problems to be Solved

In shooting of a moving image, it is desired that the RAW image data are stored in a storage medium or the like. Note that a moving image formed of numerous frames has a quite large data amount, and hence it is necessary to compress the RAW image data. The RAW image data have a pixel structure which depends on a color array (for example, a Bayer array) of the imaging sensor. Thus, a correlation between pixels adjacent to each other in each frame is low, and a correlation between frames is also low. Accordingly, for example, when the RAW image data at a time of shooting a moving image are compressed into an MPEG format, it is not possible to obtain inherent compression efficiency of the MPEG. However, there has not been proposed a method to efficiently compress the RAW image data of continuously shot images, such as a moving image.

A proposition of the present application is to provide an image processing device and an image processing program which are capable of efficiently compressing the RAW image data of continuously shot images.

Means for Solving the Problems

An image processing device includes an imaging unit generating RAW image data of a shot image and a gradation conversion unit. The imaging unit includes an imaging sensor which converts an image of a subject into an electrical signal. Then the gradation conversion unit performs gradation conversion according to a shooting condition for each of color signals based on a pixel array of the imaging sensor on the RAW image data of continuously shot images.

DETAILED DESCRIPTION OF THE EMBODIMENT

Hereinafter, an embodiment of the present invention will be explained using the drawings.

Figure 1:
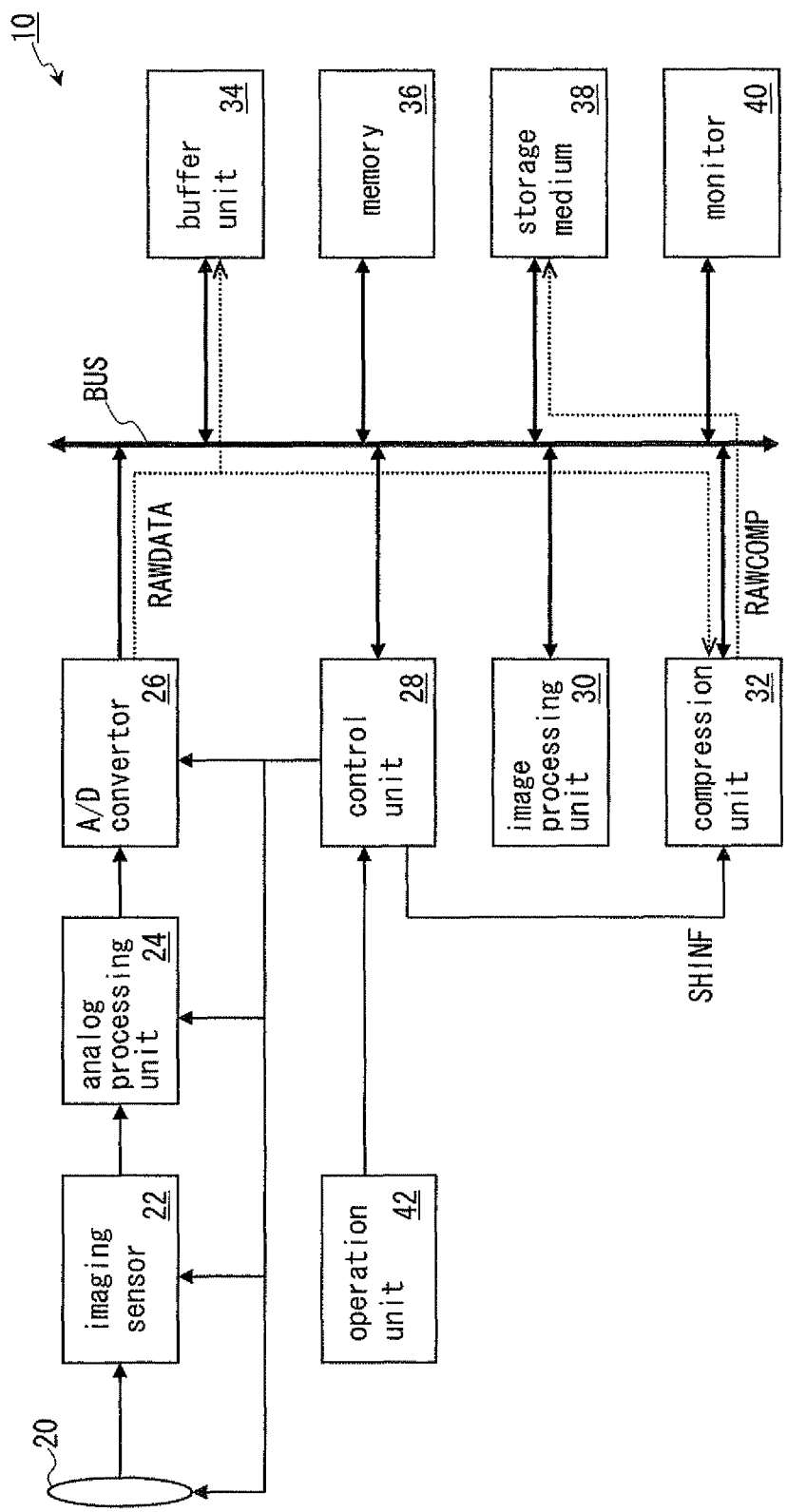
FIG. 1 is a diagram illustrating an overview of an image processing device in one embodiment.

FIG. 1 illustrates one embodiment of the present invention. An image processing device 10 of this embodiment is, for example, a digital camera capable of shooting a moving image. Hereinafter, the image processing device 10 will also be referred to as a digital camera 10. For example, the digital camera 10 has an imaging lens 20, an imaging sensor 22, an analog processing unit 24, an A/D convertor 26, a control unit 28, an image processing unit 30, a compression unit 32, a buffer unit 34, a memory 36, a storage medium 38, a monitor 40, and an operation unit 42. For example, the A/D convertor 26, the control unit 28, the image processing unit 30, the compression unit 32, the buffer unit 34, the memory 36, the storage medium 38, and the monitor 40 are coupled to a bus BUS. Note that arrows of dotted lines in the diagram illustrate an example of flows of image data RAWDATA, RAWCOMP.

The imaging lens 20 forms the image of a subject on a light-receiving surface of the imaging sensor 22. The imaging sensor 22 is, for example, a CCD image sensor or a CMOS image sensor. The imaging sensor 22 converts the image of a subject, which is incident thereon via the imaging lens 20, into an electrical signal (hereinafter referred to as an image signal), and outputs the converted electrical signal to the analog processing unit 24.

The analog processing unit 24 is an analog front end circuit which performs analog signal processing on the image signal received from the imaging sensor 22. For example, the analog processing unit 24 performs gain control to adjust the gain of the image signal, correlated double sampling processing for reducing noise components of the image signal, and/or the like to generate analog image data. Then, the analog processing unit 24 outputs the generated analog image data to the A/D convertor 26.

The A/D convertor 26 converts the analog image data received from the analog processing unit 24 into digital image data, to thereby generate RAW image data RAW-DATA. Then, the A/D convertor 26 outputs the RAW image data RAWDATA to the compression unit 32 and the buffer unit 34. Thus, the imaging sensor 22, the analog processing unit 24, and the A/D convertor 26 function as an imaging unit generating RAW image data of a shot image.

In the RAW image data RAWDATA, based on a pixel array (for example, a Bayer array) of the imaging sensor 22, luminance information of one color is stored in one pixel. Hereinafter, the data format in which luminance information of one color is stored in one pixel will be referred to as a RAW format.

The control unit 28 is, for example, a microprocessor, and controls operation of the digital camera 10 based on a program stored in the memory 36. For example, the control unit 28 performs auto-focus control, exposure control, white balance control, recording of image data, and the like.

The image processing unit 30 performs image processing including at least color interpolation processing on the RAW image data RAWDATA stored in the buffer unit 34, so as to generate normal image data of the shot image. Thus, the digital camera 10 can store the normal image data in the storage medium 38 or the like as necessary. Here, the color interpolation processing is, for example, processing of interpolating luminance information of an insufficient color of each pixel by utilizing color information (luminance information) of surrounding pixels. Therefore, in the normal image data which are image data on which image processing such as color interpolation processing is performed, each pixel has luminance information of all colors (for example, red, green, blue). Note that, for example, the image processing unit 30 may perform image processing such as white balance processing, contour compensation processing, gamma processing, noise-reduction processing, and/or the like on the RAW image data RAWDATA, other than the color interpolation processing.

The compression unit 32 compresses, for example, the RAW image data RAWDATA of a moving image in the RAW format without changing this format, so as to generate compressed image data RAWCOMP. For example, the compression unit 32 performs gradation conversion according to a shooting condition, for each of color signals based on the pixel array of the imaging sensor 22, on the RAW image data RAWDATA of continuously shot images. Then, the compression unit 32 performs compression processing utilizing a correlation between a spatial direction and a temporal direction, for each of the color signals, on the RAW image data RAWDATA on which the gradation conversion is performed. The compressed image data RAWCOMP generated by the compression unit 32 are stored in, for example, the storage medium 38.

Thus, in this embodiment, the compression unit 32 functions as a gradation conversion unit performing gradation conversion according to a shooting condition, for each of color signals based on the pixel array of the imaging sensor 22, on the RAW image data RAWDATA of continuously shot images. Moreover, the compression unit 32 functions as an image compression unit performing compression processing utilizing a correlation between a spatial direction and a temporal direction, for each of the color signals, on the RAW image data RAWDATA on which the gradation conversion is performed. That is, in this embodiment, the compression unit 32 has the gradation conversion unit and the image compression unit.

Here, the shooting condition includes at least one of, for example, an exposure condition at a time of shooting, a white balance at a time of shooting, and a luminance of an image. Note that the shooting condition may include, for example, transition information based on a chronological change of at least one of an exposure condition at a time of shooting, a white balance at a time of shooting, and a luminance of an image.

For example, when the exposure condition at a time of shooting and the white balance at a time of shooting are included in the shooting condition, the compression unit 32 obtains shooting information SHINF indicating the exposure condition, the white balance, and so on at a time of shooting from the control unit 28. Further, for example, when the luminance of an image is included in the shooting condition, the compression unit 32 analyzes a luminance signal of the RAW image data RAWDATA, and calculates luminance information indicating the luminance of the image. The luminance information calculated from the RAW image data RAWDATA are information corresponding to, for example, a light amount at a time of shooting, such as a luminance distribution of an image or an average luminance of the entire screen.

Note that the compression unit 32 may compress the RAW image data RAWDATA of a still image in the RAW format without changing this format. In this case, the compression unit 32 performs compression processing utilizing, for example, a correlation of a spatial direction, for each of the color signals, on the RAW image data RAW-DATA on which gradation processing is performed. An existing compression coding method such as a JPEG (Joint Photographic Experts Group) format can be applied to the compression processing for each of the color signals of the RAW image data RAWDATA in the still image.

Further, the compression unit 32 may have a function to compress the normal image data (image data after image processing). In this case, the compression unit 32 compresses the normal image data of a moving image by using a compression coding method such as an MPEG (Moving Picture Experts Group) format or H.264/MPEG-4 AVC format. Alternatively, the compression unit 32 compresses the normal image data of a still image by using the compression coding method such as a JPEG format.

The buffer unit 34 temporarily stores, for example, the RAW image data RAWDATA received from the A/D convertor 26. The memory 36 is an internal memory formed of, for example, a non-volatile memory such as a flash memory, and stores a program and so on for controlling operation of the digital camera 10.

The storage medium 38 stores the compressed image data RAWCOMP and the like of a shot image via a storage medium interface (not illustrated). The monitor 40 is, for example, a liquid crystal display and displays a through image, a menu screen, and/or the like. The operation unit 42 has a release button and various other switches, and is operated by the user for operating the digital camera 10.

Figure 2:
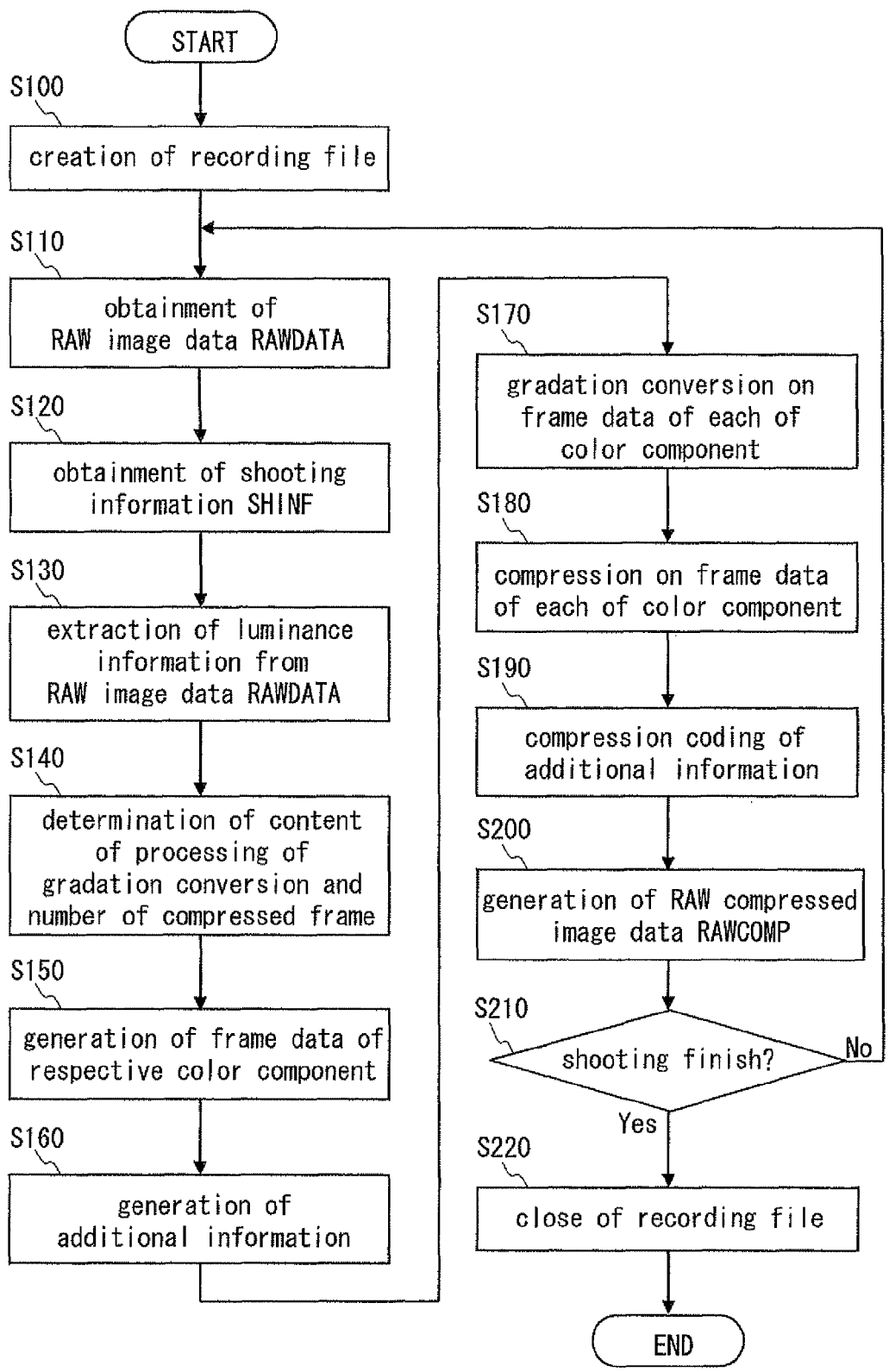
FIG. 2 is a diagram illustrating an example of operation of a compression unit illustrated in FIG. 1.

FIG. 2 illustrates an example of operation of the compression unit 32 illustrated in FIG. 1. Note that FIG. 2 illustrates an example of operation of the compression unit 32 when moving image shooting is performed. For example, steps S100-S220 are performed by the compression unit 32 according to an image processing program stored in the memory 36. First, as the moving image shooting starts, step S100 is performed.

In step S100, the compression unit 32 creates a recording file used for recording the compressed image data RAW-COMP in the storage medium 38.

In step S110, the compression unit 32 sequentially obtains the RAW image data RAWDATA corresponding to each frame of the moving image from the A/D convertor 26. Note that the RAW image data RAWDATA are stored sequentially in the buffer unit 34 as explained in FIG. 1. Therefore, the compression unit 32 may sequentially read the RAW image data RAWDATA from the buffer unit 34. In this case, it is not necessary for the A/D convertor 26 to output the RAW image data RAWDATA to the compression unit 32.

In step S120, the compression unit 32 sequentially obtains the shooting information SHINF of each frame from the control unit 28, and sequentially stores the obtained shooting information SHINF in the buffer unit 34 or the like. The shooting information SHINF is information indicating the exposure condition, the white balance, and so on at a time of shooting of each frame of the moving image, and is referred when, for example, the contents of processing of the gradation conversion or the like are determined (step S140). Accordingly, the compression unit 32 may store the shooting information SHINF of a predetermined time (for example, one second) before the current frame in the buffer unit 34 or the like. Note that the compression unit 32 may have a buffer for storing the shooting information SHINF.

In step S130, the compression unit 32 sequentially extracts the luminance information of each frame of the moving image from the RAW image data RAWDATA, and sequentially stores the extracted luminance information in the buffer unit 34 or the like. The luminance information is a luminance distribution of an image, an average luminance of a frame (entire screen), or the like, and is referred when, for example, the contents of processing of the gradation conversion or the like are determined (step S140). Accordingly, the compression unit 32 may store the luminance information of a predetermined time (for example, approximately one second) before the current frame in the buffer unit 34 or the like. Note that this compression unit 32 may have a buffer for storing the luminance information. Here, extraction of the luminance information is performed by analyzing a luminance signal of the RAW image data RAWDATA. For example, the compression unit 32 extracts the luminance distribution of an image based on the luminance signal of a green component of the RAW image data RAWDATA.

In step S140, the compression unit 32 determines the contents of processing of the gradation conversion and the number of compressed frames based on the shooting information SHINF (the exposure condition at a time of shooting, the white balance at a time of shooting, and so on) and the luminance information (luminance distribution of an image, or the like) stored in the buffer unit 34. For example, the compression unit 32 determines the contents of processing of the gradation conversion and the number of compressed frames by generally considering the exposure condition at a time of shooting, the white balance at a time of shooting, and the luminance of an image. Note that the compression unit 32 may determine the contents of processing of the gradation conversion and the number of compressed frames based on at least one of the exposure condition at a time of shooting, the white balance at a time of shooting, and the luminance of an image. Alternatively, the compression unit 32 may determine the contents of processing of the gradation conversion and the number of compressed frames according to transition information based on a chronological change of at least one of the exposure condition at a time of shooting, the white balance at a time of shooting, and the luminance of an image.

Figure 4:
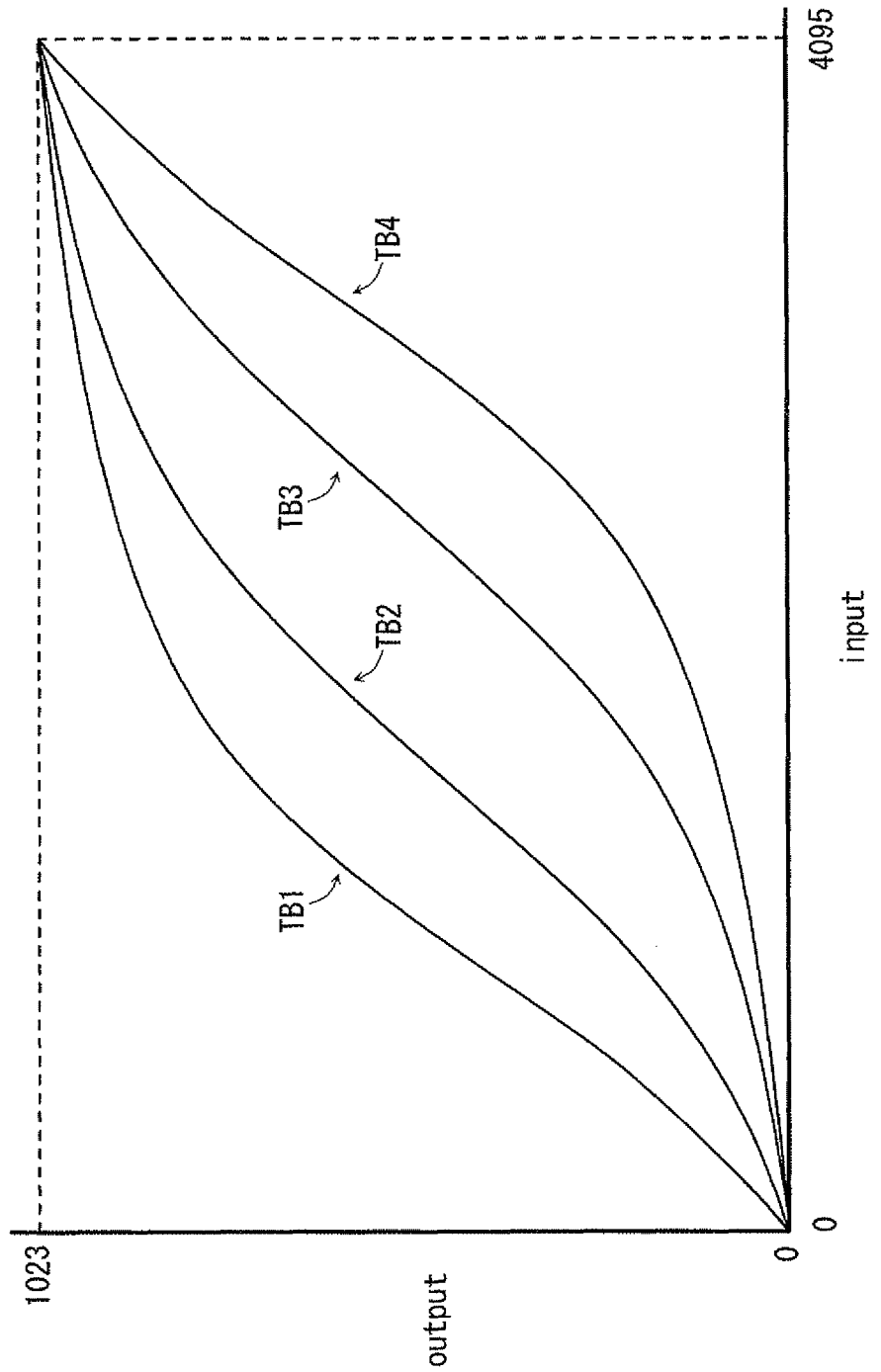
FIG. 4 is a diagram illustrating an example of input/output characteristics of a gradation conversion table.

Here, determination of the contents of processing of the gradation conversion is to select a gradation conversion table used for the gradation conversion when a plurality of gradation conversion tables are prepared in advance as illustrated in FIG. 4 for example, which will be described later. For example, when the luminance of an image (such as a luminance distribution or an average luminance) is biased to a low luminance side, the compression unit 32 selects a gradation conversion table which leaves the gradation of a low luminance part from among the plurality of gradation conversion tables prepared in advance.

Determination of the number of compressed frames is to determine the cycle of frames used as a reference for compression processing in a temporal direction (hereinafter also referred to as reference frames). That is, the number of compressed frames corresponds to the cycle of the reference frames. For example, in the H.264/MPEG-4 AVC, the number of compressed frames corresponds to the cycle of an IDR (Instantaneous Decoder Refresh) picture. Note that the number of compressed frames may either be constant or variable. For example, when the chronological change of at least one of the exposure condition at a time of shooting, the white balance at a time of shooting, and the luminance information is large, the compression unit 32 changes the number of compressed frames. Note that the above-described determination of the contents of processing of the gradation conversion is performed for each reference frame, for example. For example, the compression unit 32 selects, for each reference frame, the gradation conversion table used for the gradation conversion from among the plurality of gradation conversion tables prepared in advance. Thus, the contents of processing of the gradation conversion are updated for each reference frame.

Figure 3:
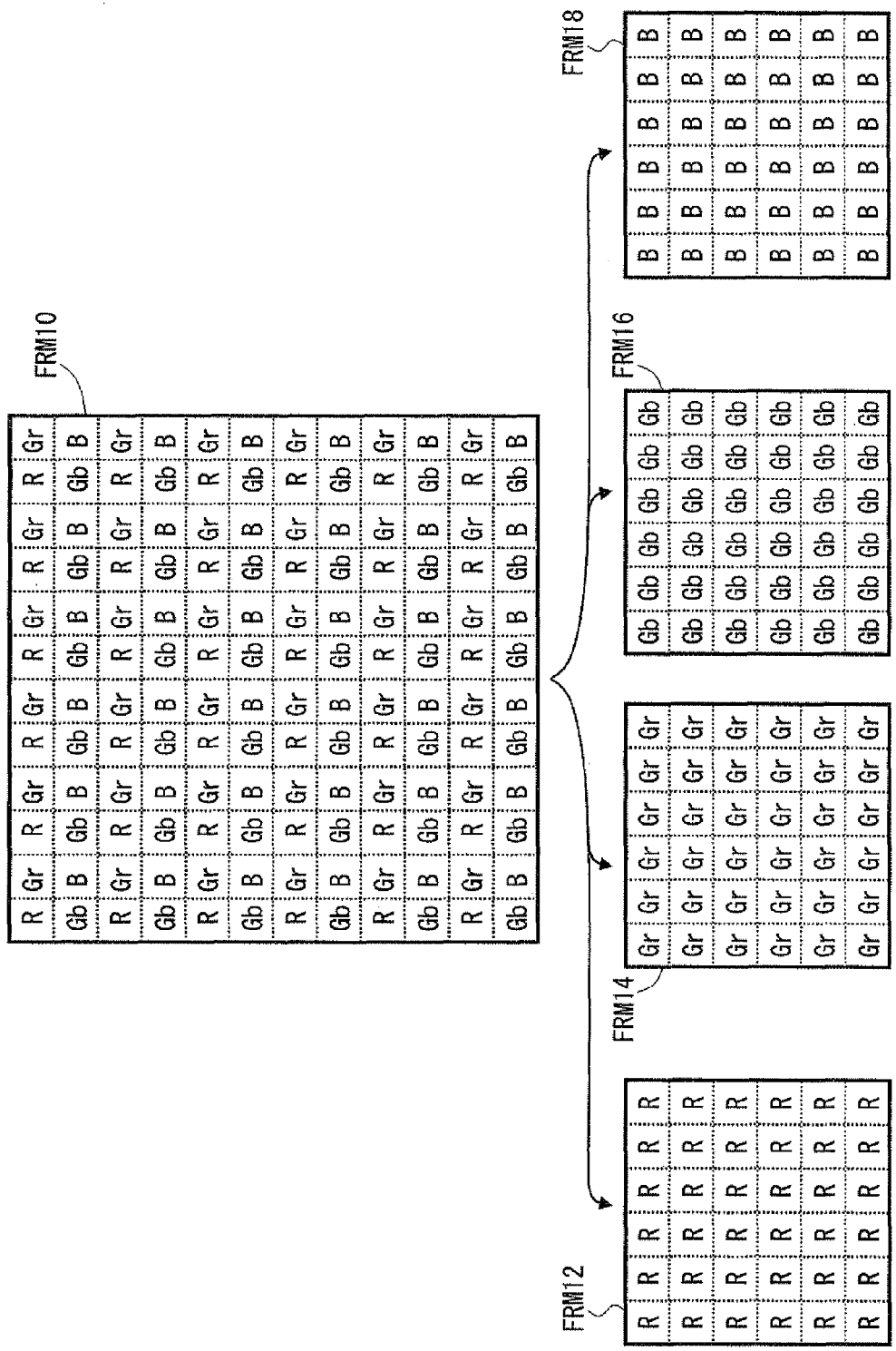
FIG. 3 is a diagram illustrating an example of frame data of respective color components.

In step S150, the compression unit 32 separates the RAW image data RAWDATA obtained in step S110 by color signal (color component) to generate frame data of respective color components. For example, when the pixel array of the imaging sensor 22 is the Bayer array, the compression unit 32 generates four frame data, frame data FRM12, FRM14, FRM16, and FRM18 of R (red) components, Gr (green) components, Gb (green) components, and B (blue) components, respectively, as illustrated in FIG. 3 which will be described later. The frame data FRM12, FRM14, FRM16, FRM18 are stored in, for example, the buffer unit 34 or the like.

In step S160, the compression unit 32 generates additional information necessary for decoding the compressed image data (compressed image data RAWCOMP). The additional information is, for example, the shooting information SHINF, information indicating a color component of each piece of frame data generated in step S150, information indicating the contents of processing of the gradation conversion determined in step S140, information of compression processing (the number of compressed frames and/or the compression coding method), and so on. Note that the compression unit 32 may generate the additional information for each frame, or may generate the additional information for each reference frame. For example, when the additional information is generated for each frame, the contents of the additional information of frames other than the reference frames (for example, the contents of the shooting information SHINF) may be only a difference from the reference frames.

In step S170, the compression unit 32 performs the gradation conversion on the frame data of each of the color components generated in step S150 based on the contents of processing of the gradation conversion determined in step S140. That is, the compression unit 32 performs the gradation conversion on the RAW image data RAWDATA according to the shooting condition for each of the color components. Frame data of each of the color components on which the gradation conversion is performed are stored in, for example, the buffer unit 34 or the like.

In step S180, the compression unit 32 performs the compression processing utilizing a correlation between a spatial direction and a temporal direction on the frame data of each of the color components on which the gradation conversion is performed in step S170. That is, the compression unit 32 performs the compression processing utilizing the correlation between a spatial direction and a temporal direction, for each of the color components, on the RAW image data RAWDATA on which the gradation conversion is performed. Note that each single piece of the frame data generated in step S150 can be handled as monochrome frame data. Further, in the frame data of each of the color components, a correlation between pixels adjacent to each other is high, and a correlation between chronologically continuous frame data is also high. Accordingly, an existing compression coding method such as an MPEG format or H.264/MPEG-4 AVC format can be applied to the compression processing of the frame data of each of the color components.

In step S190, the compression unit 32 performs compression coding of the additional information generated in step S160. An existing compression coding method such as Huffman coding can be applied to the compression coding of the additional information. Note that the compression unit 32 may encrypt the additional information instead of performing the compression coding. For example, an existing encryption method such as AES (Advanced Encryption Standard) can be applied to the encryption of the additional information. The compression coding (or encryption) of the additional information is performed by a predetermined method.

In step S200, the compression unit 32 records the frame data of each of the color components on which the compression processing is performed in step S180 and the additional information on which the compression processing is performed in step S190 in the recording file created in the storage medium 38 in step S100. Note that when the additional information is created for each reference frame, the additional information may be recorded in the recording file for each reference frame, or the additional information (additional information whose contents are updated for each reference frame) may be recorded in the recording file for each frame.

In step S210, the compression unit 32 determines whether the shooting is finished or not. The compression unit 32 can determine whether the shooting is finished or not by, for example, receiving a signal or the like indicating the finish of the shooting from the control unit 28. When the shooting is not finished (No in step S210), operation of the compression unit 32 proceeds to step S110. On the other hand, when the shooting is finished (Yes in step S210), the compression unit 32 closes the recording file created in the storage medium 38 in step S220, and finishes the compression processing of the moving image.

Here, the compressed image data RAWCOMP stored in the storage medium 38 by steps S100-S220 are decoded into the moving image data in the RAW format suitable for adjusting image quality through a reverse procedure of the above-described compression processing. For example, the additional information on which the compression processing is performed is decoded, and the frame data of each of the color components are decoded based on the decoded additional information. Thus, the user can edit the moving image data in the RAW format, and can accurately perform editing of the moving image, or the like.

Note that operation of the compression unit 32 is not limited to this example. For example, steps S110, S120 and the like may be executed in parallel, or the order of execution may be reversed. Further, for example, when the luminance information is not used in step S140, the compression unit 32 may omit the processing of step S130. Alternatively, the operation to control the storage medium 38 in steps S100, S220, and the like may be performed by the control unit 28.

FIG. 3 illustrates an example of frame data FRM of respective color components. Note that FIG. 3 illustrates an example of the frame data FRM when the pixel array of the imaging sensor 22 is the Bayer array.

Frame data FRM10 of the RAW image data RAWDATA have rows in which red (R) pixels and green (Gr) pixels are disposed alternately and rows in which green (Gb) pixels and blue (B) pixels are disposed alternately. Note that the red (R), green (Gr, Gb), and blue (B) pixels have luminance information of red (R), green (Gr, Gb), and blue (B), respectively. The frame data FRM10 are separated into frame data FRM12, FRM14, FRM10, FRM18 of respective color components, as explained in above-described step S150 of FIG. 2.

For example, in the frame data FRM12, the red (R) pixels are disposed in a state that a correlation between the red (R) pixels in the frame data FRM10 is maintained. In the frame data FRM14, the green (Gr) pixels are disposed in a state that a correlation between the green (Gr) pixels in the frame data FRM10 is maintained. In the frame data FRM16, the green (Gb) pixels are disposed in a state that a correlation between the green (Gb) pixels in the frame data FRM10 is maintained. In the frame data FRM18, the blue (B) pixels are disposed in a state that a correlation between the blue (B) pixels in the frame data FRM10 is maintained. Thus, in this embodiment, a correlation between pixels adjacent to each other can be made high in each of the frame data FRM12, FRM14, FRM16, FRM18. That is, in this embodiment, a correlation between pixels adjacent to each other within a frame can be made high, and a correlation between chronologically continuous frames can be made high.

FIG. 4 illustrates an example of input/output characteristics of a gradation conversion table TB. Note that FIG. 4 illustrates an example of input/output characteristics of the gradation conversion table TB in which input gradations and output gradations are 12 bits (0 to 4095) and 10 bits (0 to 1023), respectively. The gradation conversion table TB is a table causing the number of bits of gradations of image data after the gradation conversion to be small as compared to the number of bits of gradations of image data before the gradation conversion. Therefore, the digital camera 10 has a plurality of gradation conversion tables TB having different input/output characteristics for suppressing deterioration of image quality before and after the gradation conversion.

For example, a gradation conversion table TB1 has input/output characteristics such that there is small deterioration of accuracy of gradations of a low luminance part. Gradation conversion tables TB2, TB3 have input/output characteristics such that there is small deterioration of accuracy of gradations of a medium luminance part as compared to the gradation conversion table TB1. A gradation conversion table TB4 has input/output characteristics such that there is small deterioration of accuracy of gradations of a high luminance part.

The compression unit 32 selects, in above-described step S140 of FIG. 2 for example, the gradation conversion table TB which maintains accuracy of information desired to be left in the original image data based on the shooting condition from the plurality of gradation conversion tables TB1, TB2, TB3, TB4. For example, when the luminance of an image (luminance distribution indicated by the luminance information of the image, or the like) is biased to a low luminance side, the gradation conversion table TB1 which leaves gradations of a low luminance part is selected. Alternatively, when the luminance of an image (luminance distribution indicated by the luminance information of the image, or the like) is biased to a high luminance side, the gradation conversion table TB4 which leaves gradations of a high luminance part is selected. Note that the compression unit 32 may select the gradation conversion table TB based on the white balance at a time of shooting, or select the gradation conversion table TB based on the exposure condition at a time of shooting. Alternatively, the compression unit 32 may select the gradation conversion table TB based on plural pieces of information such as the luminance information of an image, the white balance at a time of shooting, and the like.

Thus, in this embodiment, since the gradation conversion table TB corresponding to the shooting condition is selected, deterioration of image quality before and after the gradation conversion can be suppressed. Therefore, in this embodiment, the data amount of image data after the gradation conversion (image data on which the compression processing is to be performed) can be made small as compared to the data amount of image data before the gradation conversion, while suppressing deterioration of image quality before and after the gradation conversion.

Here, even when the white balance at a time of shooting is included in the shooting condition, it is not necessary for the digital camera 10 to have the gradation conversion table TB corresponding to the white balance. In this case, for example, the compression unit 32 multiplies each of color signals by a gain value of each of the color signals corresponding to the white balance. Thereafter, the compression unit 32 performs the gradation conversion by utilizing the gradation conversion table TB selected according to the luminance information of an image, or the like. Thus, the number of gradation conversion tables TB prepared in advance can be reduced.

As described above, in this embodiment, the digital camera 10 has the compression unit 32 which compresses the RAW image data RAWDATA of continuously shot images in the RAW format without changing this format. The compression unit 32 performs the gradation conversion on the RAW image data RAWDATA of continuously shot images such as a moving image based on the shooting condition for each of color signals, and compresses the RAW image data RAWDATA after the gradation conversion for each of the color signals. Thus, in this embodiment, it is possible to efficiently compress the RAW image data RAWDATA of continuously shot images while suppressing deterioration of image quality before and after the gradation conversion. That is, in this embodiment, it is possible to provide an image processing device and an image processing program which are capable of efficiently compressing the RAW image data of continuously shot images.

Further, the compressed image data RAWCOMP generated by the digital camera 10 of this embodiment are decoded into moving image data in the RAW format which are suitable for adjusting image quality through a reverse procedure of the compression processing illustrated in FIG. 2. For example, when the moving image is edited after shooting, the compressed image data RAWCOMP are decoded into the RAW image data RAWDATA before the gradation conversion. Thus, the user can accurately perform editing of the moving image, or the like. That is, in this embodiment, it is possible to provide moving image data with which editing of a moving image or the like can be performed accurately.

Note that an example in which the RAW image data RAWDATA of a moving image are compressed in the RAW format without changing this format has been described in the above-described embodiment. The present invention is not limited to such an embodiment. For example, the RAW image data RAWDATA of images obtained by continuous shooting may be compressed in the RAW format without changing this format. In this case, the same effects as those in the above-described embodiment can be obtained.

In the above-described embodiment, an example in which the frame data FRM10 of the Bayer array are separated into four frame data, frame data FRM12, FRM14, FRM16, and FRM18, has been described. The present invention is not limited to such an embodiment. For example, the frame data FRM10 may be separated into three frame data, frame data of red (R), green (G), and blue (B). In this case, for example, frame data FRM14, FRM16 of two greens (Gr, Gb) are combined into frame data of one green (G) by obtaining the average of the two greens (Gr, Gb). In the additional information, information indicating that the two greens (Gr, Gb) in the Bayer array are combined into one green (G) is included. In this case, the same effects as those in the above-described embodiment can be obtained.

In the above-described embodiment, an example of the case where the RAW image data RAWDATA are in the Bayer array has been described. The present invention is not limited to such an embodiment. For example, the RAW image data RAWDATA may be in a color array other than the Bayer array. Further, the RAW image data RAWDATA may be in a color array other than the red (R), green (Gr, Gb), and blue (B). For example, the RAW image data RAWDATA may be in a color array of CMY (cyan, magenta, yellow). In this case, the same effects as those in the above-described embodiment can be obtained.

In the above-described embodiment, an example of the case where the image processing device 10 is applied to a digital camera has been described. The present invention is not limited to such an embodiment. For example, the image processing device of the present invention may be applied to an electronic device such as a cellular phone with a camera which has the functions of continuous shooting and moving image shooting or a digital video. In this case, the same effects as those in the above-described embodiment can be obtained.

In the above-described embodiment, an example in which the image processing device 10 is structured to include the imaging sensor 22 has been described. The present invention is not limited to such an embodiment. For example, the image processing device 10 will suffice to have at least the compression unit 32. Further, the processing executed by the compression unit 32 (steps S100-S220 of FIG. 2) may be executed by an external processing apparatus such as a computer. That is, the image processing program may cause the external processing apparatus such as a computer to execute the processing executed by the compression unit 32 (steps S100-S220 of FIG. 2). For example, the image processing program is installed in the external processing apparatus via a storage medium such as a CD-ROM which can be read by the external processing apparatus, or via a communication line such as the Internet.

The many features and advantages of the embodiment are apparent from the detailed specification and, thus, it is intended by the appended claims to cover all such features and advantages of the embodiment that fall within the true spirit and scope thereof. Further, since numerous modifications and changes will readily occur to those skilled in the art, it is not desired to limit the inventive embodiment to exact construction and operation illustrated and described, and accordingly all suitable modifications and equivalents may be resorted to, falling within the scope of thereof.

The invention claimed is:

1. An image processing device comprising:
  an imaging unit that shoots a subject and generates a plurality of RAW image data;
  a gradation conversion unit configured to perform gradation conversion on a plurality of color signals of the plurality of RAW image data of continuously shot images according to a shooting condition for each of the plurality of color signals based on a pixel array of the imaging unit; and
  a compression processing unit configured to determine a number of compressed frames based on the shooting condition, and to perform compression processing utilizing a correlation between a spatial direction and a temporal direction for each of the plurality of color signals on which the gradation conversion has been performed,
  wherein the gradation conversion unit performs the gradation conversion on one color signal from among the plurality of color signals according to the shooting condition for each of first and second signals relating to the one color signal based on the pixel array.

2. The image processing device according to claim 1, further comprising
  a buffer unit that temporarily stores the plurality of RAW image data.

3. The image processing device according to claim 1, wherein
  the shooting condition includes at least one of an exposure condition at a time of shooting, a white balance at the time of shooting, and a luminance of an image.

4. The image processing device according to claim 1, further comprising
  a plurality of gradation conversion tables causing a number of bits of gradations of an image after the gradation conversion to be smaller than a number of bits of gradations of an image before the gradation conversion, wherein
  the gradation conversion unit selects a gradation conversion table used for the gradation conversion from among the plurality of gradation conversion tables based on the shooting condition.

5. The image processing device according to claim 1, wherein
  the shooting condition includes transition information based on a chronological change of at least one of an exposure condition at a time of shooting, a white balance at the time of shooting, and a luminance of an image.

6. The image processing device according to claim 1, wherein
  the one color signal is of a first color component, the first signal is of pixels of the first color component that alternate with pixels of a second color component different from the first color component in the pixel array, and the second signal is of pixels of the first color component that alternate with pixels of a third color component different from the first and second color components in the pixel array.

7. The image processing device according to claim 1, wherein
  the one color signal is a green color signal, the first signal is of green pixels that alternate with red pixels in the pixel array, and the second signal is of green pixels that alternate with blue pixels in the pixel array.

8. A non-transitory storage medium storing an image processing program which compresses a plurality of RAW image data generated by an imaging unit, the program causing a computer to execute:
  gradation conversion processing on a plurality of color signals of the plurality of RAW image data of continuously shot images according to a shooting condition for each of the plurality of color signals based on a pixel array of the imaging unit; and
  processing that determines a number of compressed frames based on the shooting condition, and compression processing utilizing a correlation between a spatial direction and a temporal direction for each of the plurality of color signals on which the gradation conversion processing has been performed,
  wherein the gradation conversion processing performs the gradation conversion on one color signal from among the plurality of color signals according to the shooting condition for each of first and second signals relating to the one color signal based on the pixel array.

9. The non-transitory storage medium storing the image processing program according to claim 8, wherein
  the shooting condition includes at least one of an exposure condition at a time of shooting, a white balance at the time of shooting, and a luminance of an image.

10. The non-transitory storage medium storing the image processing program according to claim 8, comprising
  selecting a gradation conversion table used for the gradation conversion processing based on the shooting condition from among a plurality of gradation conversion tables causing a number of bits of gradations of an image after the gradation conversion processing to be smaller than a number of bits of gradations of an image before the gradation conversion processing.

11. The non-transitory storage medium storing the image processing program according to claim 8, wherein
  the shooting condition includes transition information based on a chronological change of at least one of an exposure condition at a time of shooting, a white balance at the time of shooting, and a luminance of an image.

12. The non-transitory storage medium storing the image processing program according to claim 8, wherein
  the one color signal is of a first color component, the first signal is of pixels of the first color component that alternate with pixels of a second color component different from the first color component in the pixel array, and the second signal is of pixels of the first color component that alternate with pixels of a third color component different from the first and second color components in the pixel array.

13. The non-transitory storage medium storing the image processing program according to claim 8, wherein
  the one color signal is a green color signal, the first signal is of green pixels that alternate with red pixels in the pixel array, and the second signal is of green pixels that alternate with blue pixels in the pixel array.

* * * * *